(12) United States Patent
Wolff et al.

(10) Patent No.: US 10,029,664 B2
(45) Date of Patent: Jul. 24, 2018

(54) BRAKING SYSTEM AND METHOD FOR A VEHICLE

(71) Applicant: General Electric Company, Schenectady, NY (US)

(72) Inventors: Jeffrey Wolff, Lawrence Park, PA (US); Henry Young, Erie, PA (US); Timothy Brown, Erie, PA (US); Carlos Vallejo, Erie, PA (US); Sean Cillessen, Erie, PA (US); Kenneth Nedley, Erie, PA (US); Larry Bench, Casper, WY (US)

(73) Assignee: General Electric Company, Schenectady, NY (US)

( * ) Notice: Subject to any disclaimer, the term of this patent is extended or adjusted under 35 U.S.C. 154(b) by 20 days.

(21) Appl. No.: 14/899,822

(22) PCT Filed: Feb. 4, 2015

(86) PCT No.: PCT/US2015/014524
§ 371 (c)(1),
(2) Date: Dec. 18, 2015

(87) PCT Pub. No.: WO2015/120099
PCT Pub. Date: Aug. 13, 2015

(65) Prior Publication Data
US 2016/0332610 A1  Nov. 17, 2016

Related U.S. Application Data

(60) Provisional application No. 61/935,361, filed on Feb. 4, 2014.

(51) Int. Cl.
*B60T 13/66*  (2006.01)
*B60T 13/58*  (2006.01)
(Continued)

(52) U.S. Cl.
CPC .............. *B60T 13/662* (2013.01); *B60T 1/10* (2013.01); *B60T 7/042* (2013.01); *B60T 13/586* (2013.01); *B60T 13/588* (2013.01)

(58) Field of Classification Search
None
See application file for complete search history.

(56) References Cited

U.S. PATENT DOCUMENTS 5,653,517 A * 8/1997 Burckhardt ............. B60T 8/172
303/139
6,820,727 B1  11/2004 Theiss et al.
(Continued)

FOREIGN PATENT DOCUMENTS

JP  2004225742 A  8/2004
JP  2006205912 A  8/2006

OTHER PUBLICATIONS

PCT Search Report issued in connection with corresponding Application No. PCT/US2015/014524 dated May 3, 2015.

*Primary Examiner* — Thomas G Black
*Assistant Examiner* — Demetra R Smith-Stewart
(74) *Attorney, Agent, or Firm* — GE Global Patent Operation; John A. Kramer

(57) ABSTRACT

A control system for a vehicle includes an electric drive system associated with a first set of wheels (e.g., rear wheels) of a vehicle and a drive system control unit configured to control the electric drive system to selectively provide electric motive power to the first set of wheels to propel the vehicle and electric retarding to slow the vehicle. The system further includes a friction brake system having a first friction brake unit associated with the first set of wheels and a second friction brake unit associated with a second set of wheels (e.g., front wheels) of the vehicle. The drive system control unit is further configured, in at least one mode of operation, to independently control the first and (Continued)

second friction brake units to concurrently apply different levels of friction braking to the first and second sets of wheels, to reduce wear unevenness.

21 Claims, 4 Drawing Sheets

(51) Int. Cl.
    *B60T 7/04*     (2006.01)
    *B60T 1/10*     (2006.01)

(56) References Cited

U.S. PATENT DOCUMENTS

| | | | |
|---|---|---|---|
| 7,647,997 B2 * | 1/2010 | Oliver | B60K 6/12 |
| | | | 180/165 |
| 8,634,971 B2 * | 1/2014 | Cahill | B60T 8/00 |
| | | | 188/1.11 L |
| 2008/0100129 A1 | 5/2008 | Lubbers | |
| 2009/0118887 A1 | 5/2009 | Minarcin et al. | |
| 2015/0001914 A1 * | 1/2015 | Antao | B60T 7/042 |
| | | | 303/3 |
| 2015/0081150 A1 | 3/2015 | Wolff et al. | |
| 2017/0057476 A1 * | 3/2017 | Schwartz | B60T 8/172 |

* cited by examiner

BRAKING SYSTEM AND METHOD FOR A VEHICLE

CROSS-REFERENCE TO RELATED APPLICATIONS

This application claims priority to U.S. Provisional Application No. 61/935,361, filed Feb. 4, 2014, which is hereby incorporated by reference herein in its entirety.

FIELD OF THE INVENTION

Embodiments of the invention relate generally to vehicle braking systems. Other embodiments relate to controlling vehicle braking to reduce friction brake wear unevenness.

BACKGROUND OF THE INVENTION

Large off-highway vehicles ("OHVs"), such as mining vehicles used to haul heavy payloads excavated from open pit mines, are well known and typically employ motorized wheels for propelling or retarding the vehicle in an energy efficient manner. This efficiency is typically accomplished by employing a large horsepower diesel engine in conjunction with an alternator, a main traction inverter, and a pair of wheel drive assemblies housed within the rear tires of the vehicle. The diesel engine is directly associated with the alternator such that the diesel engine drives the alternator. The alternator powers the main traction inverter, which supplies electrical power having a controlled voltage and frequency to electric drive motors of the two wheel drive assemblies. Each wheel drive assembly houses a planetary gear transmission that converts the rotation of the associated drive motor energy into a high torque, low speed rotational energy output which is supplied to the rear wheels.

In existing OHVs, friction brakes are applied with a fixed braking pressure proportion between front and rear braking systems. Because operating loads in an OHV may exceed one hundred tons, and the gross weight of the vehicle and load may be several hundred tons, this may result in varying wear rates between the front and rear friction brakes, requiring the front and rear friction brakes to be replaced at different times and thereby increasing maintenance costs. Accordingly, it may be desirable to provide a braking system and method that different from existing systems and methods.

BRIEF DESCRIPTION OF THE INVENTION

In an embodiment, a control system (e.g., braking control system) for a vehicle includes an electric drive system associated with a first set of wheels (e.g., rear wheels) of a vehicle and a drive system control unit configured to control the electric drive system to selectively provide electric motive power to the first set of wheels to propel the vehicle and electric retarding to slow the vehicle. The system further includes a friction brake system having a first friction brake unit associated with the first set of wheels and a second friction brake unit associated with a second set of wheels (e.g., front wheels) of the vehicle. The drive system control unit is further configured, in at least one mode of operation, to independently control the first and second friction brake units to concurrently apply different levels of friction braking to the first and second sets of wheels.

According to one aspect, in this manner, the drive system control unit may be configured to control a blended braking operation of the electric retarding applied to the first set of wheels and friction braking applied to the second set of wheels (e.g., with or without concurrent or subsequent friction braking of the first set of wheels). In another aspect, alternatively or additionally, the drive system control unit may be configured to determine how much friction braking to apply to the first and second sets of wheels, at least during relatively low-level brake applications (e.g., brake pedal is moved to no more than 25% of its travel distance away from its unactuated position), for a more even degree of friction brake wear of the first and second sets of wheels over time.

BRIEF DESCRIPTION OF THE DRAWINGS

The present invention will be better understood from reading the following description of non-limiting embodiments, with reference to the attached drawings. Wherever possible, the same reference numerals used throughout the drawings refer to the same or like parts.

DETAILED DESCRIPTION OF THE INVENTION

Reference will be made below in detail to exemplary embodiments of the invention, examples of which are illustrated in the accompanying drawings. Although embodiments are described with respect to haul trucks having a diesel engine that are utilized in the surface mining industry, embodiments of the invention are also applicable for use with internal combustion engines and vehicles employing such engines, generally. For example, the vehicles may be OHVs designed to perform an operation associated with a particular industry, such as mining, construction, farming, etc., and may include haul trucks, cranes, earth moving machines, mining machines, farming equipment, tractors, material handling equipment, earth moving equipment, etc. Alternatively or additionally, the vehicles may be on-road vehicles, such as tractor-trailer rigs, on-road dump trucks, etc.

Embodiments of the invention relate to a control system (e.g., braking control system) for an OHV or other vehicle. The system includes independent front brake control, i.e., front and rear friction brakes of the vehicle can be concurrently applied at different brake pressure levels, and is configured to determine the amounts of front and rear friction braking to apply during relatively low-level friction brake applications, for blended braking (combining friction braking with electric retarding) and/or reducing wear unevenness between the front and rear friction brakes.

Figure 1:
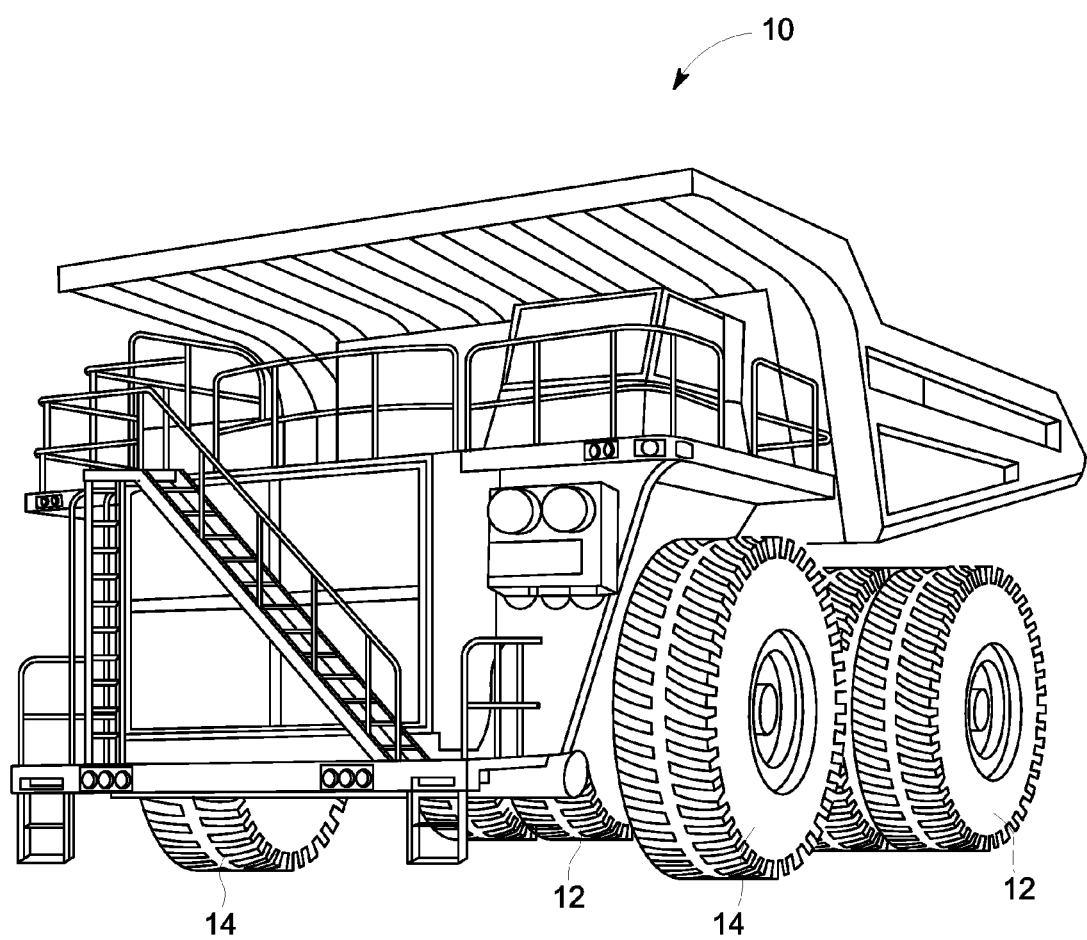
FIG. 1 is a perspective view of a vehicle according to an embodiment of the invention.

FIG. 1 illustrates a vehicle 10 in which a control system 16 of the present invention may be incorporated. (The control system 16 is described below in regards to FIGS. 3-4 and elsewhere herein.) The vehicle 10, as illustrated, may be a haul truck configured for use in high-production mining and heavy-duty construction environments, and includes a first set of wheels 12, which may be rear wheels, and a second set of wheels 14, which may be front wheels. The first set of wheels 12 may be drive wheels that are coupled to an electric drive system 100 (see FIG. 2) which provides motive power to the vehicle 10. The second set of wheels 14 may be operably coupled to a vehicle steering system for vehicle steering.

Figure 2:
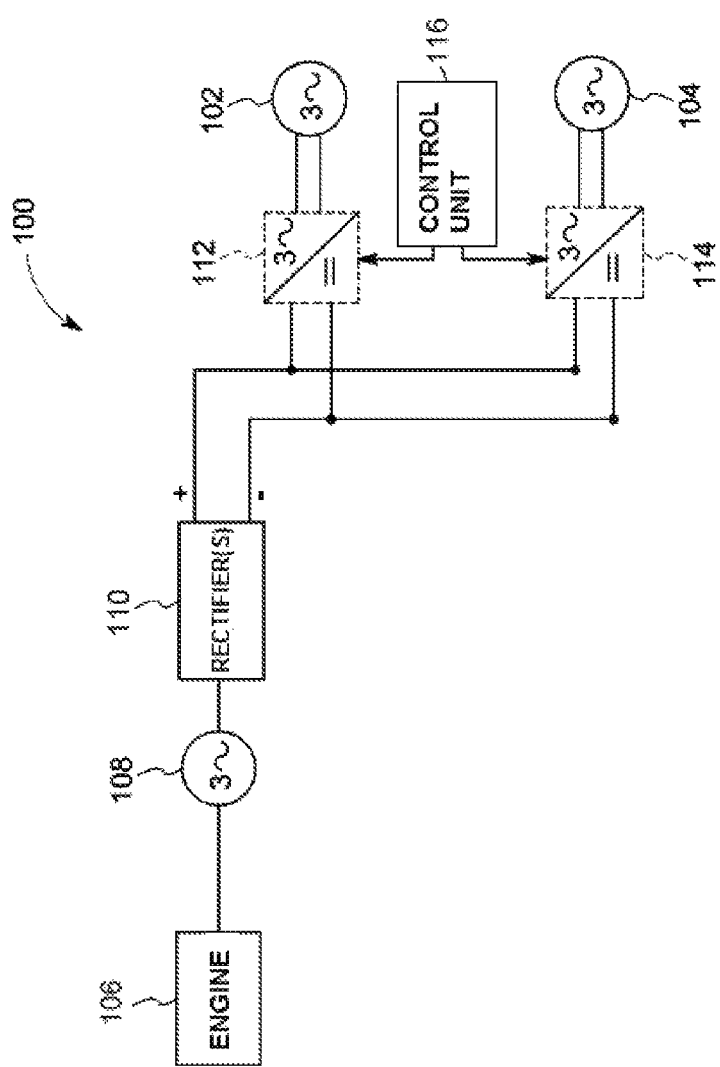
FIG. 2 is a schematic diagram of an electric drive system, according to an embodiment.

An embodiment of the electric drive system 100 is shown in FIG. 2. The electric drive system 100 is at least partially housed within the vehicle 10, and comprises a three-phase alternating current (AC) generator/alternator 108 that is coupled to be mechanically driven by an engine 106 (e.g., a diesel engine). An AC output of the generator 108 is fed into one or more rectifiers 110, which are configured to convert the AC output of the generator/alternator 108 to a direct current (DC) output. The DC output of the rectifiers 110 is supplied to a DC bus, which (among other loads) feeds into a set of inverters 112, 114. The inverters 112, 114 are configured to convert DC power from the DC bus into controlled three-phase, variable frequency AC power. Outputs of the inverters 112, 114 are electrically connected to electric motors 102, 104 (respectively), and the AC power output by the inverters 112, 114 has a waveform suitable for driving the electric motors 102, 104. The electric motors 102, 104 are operably coupled to the drive wheels 12 of the first set of wheels. For example, the motors 102, 104 may be three-phase, AC induction wheel motors. If the wheels of the second set of wheels 14 are drive wheels, then the electric drive system 100 would include additional inverters and electric motors coupled similarly to the inverters 112, 114 and motors 102, 104 in FIG. 2.

As further shown in FIG. 2, a drive system control unit 116 is electrically coupled to the electric drive system 100. For example, the drive system control unit may be connected to the inverters 112, 114. The drive system control unit 116, among other tasks, is configured to determine and send a desired torque request signal to the inverters 112, 114. The torque request signal is processed by the control unit for the inverters 112, 114 to drive the motors 102, 104 to the desired torque output magnitude, and in the desired rotational direction corresponding to the intended direction of vehicle movement. The control unit is also configured to control the motors 102, 104 to provide retarding tractive effort to the wheels 12 (e.g., rear wheels) to slow or stop the vehicle 10. In particular, when operating in an electric braking mode, also known as electric retarding, the electric motors 102, 104 are reversed to act as generators, and the drive wheels 12 of the vehicle 10 drive the electric motors 102, 104. Driving the motors 102, 104 places a torque on the drive wheels 12 and causes them to slow, thus braking the vehicle. In an embodiment, the control unit 116 includes one or more microprocessors operating according to a set of stored instructions to provide for vehicle control, as discussed in detail below and elsewhere herein.

Figure 3:
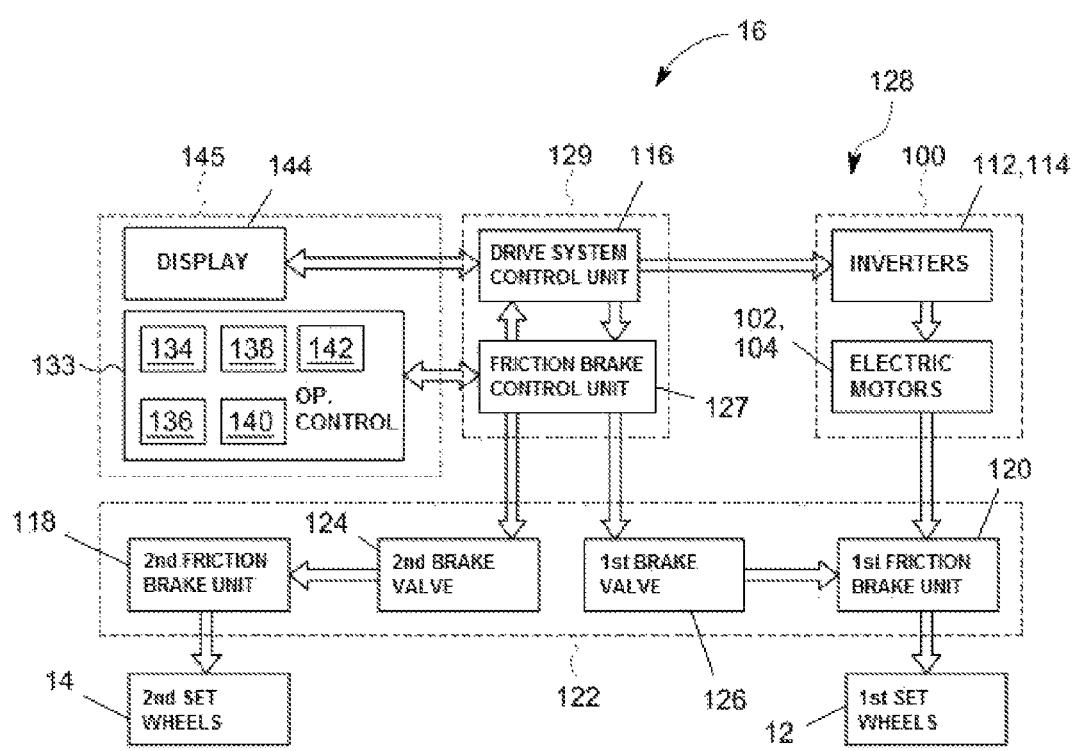
FIG. 3 is a schematic diagram illustrating a control system, according to an embodiment.

FIG. 3 shows an embodiment of the control system (e.g., braking control system) 16 in more detail. The control system 16 comprises a friction brake system 122 that includes a first (e.g., rear) friction brake unit 120 (e.g., friction brake actuation unit) associated with the first set of wheels 12 (e.g., rear wheels) of the vehicle and a second (e.g., front) friction brake unit 118 (e.g., friction brake actuation unit) associated with the second set of wheels 14 (e.g., front wheels) of the vehicle. In an embodiment, the friction brake system 122 is a hydraulic brake system, which further includes a first (e.g., rear) brake valve 126 (e.g., first brake solenoid valve) that is controllable to control the pressure of hydraulic fluid to the first friction brake unit 120, and a second (e.g., front) brake valve 124 (e.g., second brake solenoid valve) that is controllable to control the pressure of hydraulic fluid to the second friction brake unit 118. In other embodiments, other means for actuating the first and second friction brake units 120, 118 may be alternatively utilized, e.g., pneumatic friction brakes, mechanically-actuated friction brakes, electric motor-actuated friction brakes, and so on. In either (or any) embodiment, each friction brake unit may include, for example, respective components for controllably applying a friction load to a moving part associated with a wheel 12, 14, e.g., brake pads operably coupled with a vehicle axle or brake disc/rotor, hydraulically- or pneumatically-actuated calipers (or otherwise) for applying a force to the brake pads against the disc/rotor, and so on. The control system 16 may further include a friction brake control unit 127 that is configured to control application of the first and second (e.g., rear and front) friction brake units 120, 118 at least partially in response to operator inputs, such as the depression of a brake pedal 150 (see FIG. 4). ("Brake pedal" refers to any human-controlled actuator for controlling vehicle braking, and includes actuators that are positioned and configured to be controlled by a person's foot or a person's hand.)

In an embodiment, the drive system control unit 116 and friction brake control unit 127 are electrically coupled to one another and may be generally referred to as one or more controllers 129. While the drive system control unit 116 and friction brake control unit 127 are illustrated as separate components in FIG. 3, the control units 116, 127 may be integrated into a single control unit/controller/processor.

As further shown in FIG. 3, the drive system control unit 116 is electrically coupled to the drive-train 128 of the vehicle 10, which includes the electric drive system 100, e.g., engine 106, generator 108, rectifier 110, inverters 112, 114, and drive motors 102, 104 (AC induction wheel motors as shown in FIG. 2, or otherwise). When braking the vehicle 10 in an electric retarder braking mode, the control unit 116 commands the electric drive system 100 (acting in effect as an electric retarding system that includes the inverters 112, 114, and motors 102, 104) to provide a requested desired vehicle retarding torque to the wheels.

As also shown in FIG. 3, one or both of the drive system control unit 116 and/or the friction brake control unit 127 may be configured to receive inputs from an operator control 133, e.g., an ignition switch 134, an accelerator position transducer 136, a brake pedal position transducer 138, and/or a gear selector 140, for operating the electric motors 102, 104 for driving and braking the vehicle 10. The ignition switch 134 is operable to turn the vehicle on and off. The accelerator position transducer 136 is configured to detect a position of an accelerator pedal or other actuator. The brake pedal position transducer 138 is configured to detect a position of a brake pedal 150 (see FIG. 4). The gear selector 140 provides a means for permitting an operator to select an intended or desired direction of vehicle movement, such as forward movement or reverse movement. In addition or alternatively, the operator control may comprise another type of input interface 142, e.g., steering wheel or other steering controls, touchscreen or other computer interface, control input from a control system or autonomous controller, and so on. As further shown in FIG. 3, a display 144 may be electrically coupled to the drive system control unit 116 to allow an operator of the vehicle 10 to view status information relating to various vehicle systems. The display 144 and operator control(s) 133 collectively form an I/O (input/output) system 145.

With further reference to FIG. 3, in an embodiment, the control system 16 is configured to automate the operation of the vehicle when starting and stopping, while loaded, on grade. In operation, when an operator of the vehicle (the operator may be a person or an autonomous controller) requests that the vehicle come to a stop, or that the vehicle move in a certain direction (e.g., in either case through actuation of an operator control), the drive system control unit 116 communicates with the friction brake control unit 127 to control a transition from friction brakes to electrical effort/propulsion, and vice versa. In particular, the control system 16 includes an interface between the drive system control unit 116 and the friction brake control unit 127 that allows the drive system control unit 116 (e.g., in response to feedback or other information from the electric drive system 100) to request a specific braking effort from the friction brake control unit 127. This interface also allows the drive system control unit 116 to request from the friction brake control unit 127 that friction braking effort be added or removed (i.e., increased or decreased). Thus, in embodiments, the drive system control unit 116 is configured to communicate with the friction brake control unit 127 to control an amount of a friction brake application during vehicle slowing, stops, and starts. For example, the drive system control unit 116 may be configured to communicate with the friction brake control unit to at least partially automatically control the amount of the friction brake application during vehicle stops and starts on an inclined grade on which the vehicle is positioned. (At least partial automatic control means fully automatic control, or automatic control responsive to, and based in part on, an operator input, e.g., a degree or rate of braking or acceleration that is responsive and proportional to a degree of change in position of a brake pedal 150 or accelerator pedal.)

In connection with the above, the drive system control unit 116 may be configured to utilize system parameters to calculate the force needed to hold the vehicle 10 on the given inclined grade. The drive system control unit 116 then determines when to request the friction brakes be released or more friction braking effort be added in dependence upon this determined force. The force may be determined based on various methods as outlined in U.S. patent application Ser. No. 14/464,226, filed Aug. 20, 2014 (which is incorporated by reference herein in its entirety). Alternatively or additionally, the system 16 may be configured for the force to be determined based on information of the inclined grade as generated by an on-board inertial measurement unit, information on vehicle mass (e.g., determined from a weighing station, or from on-board, physics-based calculations from sensor data relating to vehicle acceleration under known conditions), other vehicle/system parameters (e.g., vehicle wheel radius), etc.

In embodiments, the control system 16 is also configured to provide anti-rollback capabilities. In particular, the drive system control unit 116 is configured to determine a torque level needed to move the vehicle from stop to up an inclined grade (i.e., the vehicle is stopped while on the inclined grade, and is then controlled to move up the inclined grade). The torque level may be determined based on the force, e.g., the torque level would be a level that at least just exceeds the force. Upon calculating the torque required (or at some point subsequent to calculating the torque), the drive system control unit 116 communicates with the friction brake control unit 127 to request removal of a friction brake application (i.e., amount of friction brake application=zero) to commence motion of the vehicle in the desired direction, without substantial rollback. Thus, in embodiments, the drive system control unit 116 is further configured, responsive to an input from an operator control (for the vehicle to move up down the inclined grade), to communicate with the friction brake control unit 127 to remove the friction brake application and concurrently control the electric drive system 100 to provide the electric motive power according to the torque level that is determined, for the vehicle to move from stop to up (or down) the inclined grade without substantial vehicle rollback. The drive system control unit 116 may be configured to communicate with the electric drive system and the friction brake control unit so that an amount and rate at which the friction brake application is removed (by the friction brake control unit controlling the friction brake system) is automatically controlled to be proportional or equivalent to an amount and rate at which additional torque is provided (by the electric drive system as controlled by the drive system control unit). For example, as the friction brake application is reduced by a particular amount, the torque is concurrently increased by an amount at least sufficient to offset the lowered friction brake application to prevent vehicle rollback until the friction brake application is completely removed, at which time additional torque is generated for the vehicle for move forward. (Without "substantial" vehicle rollback includes no vehicle rollback, and vehicle rollback below a threshold that is deemed to still meet designated safety guidelines, e.g., rollback of no more than 0.3 meters for certain haul truck applications.)

In other embodiments, the control system 16 is alternatively or additionally configured to provide controlled stop capabilities, such as when a vehicle 10 is operating on grade. In particular, the drive system control unit 116 is configured to calculate the force needed to hold the vehicle 10 on the given inclined grade, and, responsive to an input from an operator control for the vehicle to come to a stop while moving on the grade, to communicate with the friction brake control unit 127 to increase the amount of friction brake application, in dependence at least in part upon the force that is determined, to bring the vehicle to a stop and hold the vehicle stopped on the grade. The drive system control unit 116 may be further configured to calculate the force needed to bring the vehicle to a stop in the first place, and to simultaneously communicate with the friction braking control unit 127 to request an amount (and rate) of friction brake application to stop and then hold the vehicle the inclined grade. Generally, such calculations may take into account vehicle mass, current rate/velocity of travel, degree of grade incline, etc. For example, the braking force required to bring a vehicle to a stop while traveling up a grade would depend on vehicle mass and rate of deceleration (change in velocity from current velocity to zero over a given distance) less a factor due to rolling friction/resistance less a factor due to the force of gravity on the grade. The braking force then required to then hold the vehicle stopped on the grade would depend on vehicle mass, the grade, etc. as discussed above.

In embodiments, application of the friction brake system to bring a vehicle to a stop and hold the vehicle stopped on an inclined grade is concurrent with a reduction in electric retarding. Here, the drive system control unit 116 is configured to calculate the force needed to hold the vehicle 10 on the given inclined grade, and, concurrently with a reduction in the electric retarding, to communicate with the friction brake control unit to increase the amount of friction brake application, in dependence at least in part upon the force that is determined, to bring the vehicle to a stop and hold the vehicle stopped on the grade. Thus, as the vehicle is moving up an inclined grade, the drive system control unit 116, responsive to an input from an operator control for the vehicle to come to a stop, may be configured to first initiate electric retarding, and as the retarding effort by the electric drive system is reduced as the vehicle slows, concurrently communicate with the friction brake control unit to increase the amount of friction brake application. After the vehicle comes to a complete stop, the amount of electric retarding may be zero, and in such a case the amount of friction brake application will be sufficient to hold the vehicle stopped on the inclined grade. The drive system control unit 116 may be configured to automatically control the amount and rate by which the friction brake application increases concurrently with the decrease in electric retarding such that (i) an overall deceleration profile (change in velocity over time from a current non-zero velocity to zero velocity) of the vehicle is linear (and thereby smooth-seeming to human operators) and (ii) proportional in terms of rate to one or more inputs from an operator control, e.g., the drive system control unit would control the decrease in electric retarding and concurrent increase in friction braking to provide faster deceleration responsive to an input from an operator control for a higher degree/rate of braking versus an input from the operator control for a lower degree/rate of braking.

In embodiments, the control system is configured both for controlled stopping of a vehicle on an inclined grade, and anti-rollback as the vehicle is controlled to move forward (e.g., up the grade) from its stopped position. Here, the drive system control unit, responsive to a first input from an operator control for the vehicle to come to a stop while moving on the grade, is configured to determine the force (to hold the vehicle stopped on the grade), and (e.g., concurrently with a reduction in electric retarding) to communicate with the friction brake control unit to increase the amount of friction brake application, in dependence at least in part upon the force that is determined, to bring the vehicle to a stop and hold the vehicle stopped on the grade. The drive system control unit is further configured to determine a torque level needed to move the vehicle from stop to up the grade. The drive system control unit, responsive to a second input at the operator control for the vehicle to move up the grade, is further configured to: communicate with the friction brake control unit to remove the friction brake application; and concurrently control the electric drive system to provide the electric motive power according to the torque level that is determined, for the vehicle to move from stop to up the inclined grade without substantial vehicle rollback.

In other embodiments, alternatively or additionally, the control system 16 is configured for the drive system control unit 116 to determine a functionality of the second friction brake unit 118, for a friction brake application to the second set of wheels 14, independent of operation of the first friction brake unit 120. For example, the second friction brake unit may be controlled to apply friction brakes to the second set of wheels, without the first friction brake unit being controlled to apply friction brakes to the first set of wheels (i.e., no friction brakes are applied to the first set of wheels). The drive system control unit 116 is configured to control at least one vehicle system based on the determined functionality of the second friction brake unit. For example, if the second friction brake unit is deemed fully functional, the second friction brake unit and the electric drive system 100 may be controlled for a blended braking operation (e.g., of electric retarding braking of the vehicle's rear wheels, concurrent friction braking of the front wheels, and no friction braking of the rear wheels). If the second friction brake unit is determined to be nonfunctional or partially functional (i.e., greater than nonfunctional but less than fully functional), the drive system control unit may, for example, control a memory unit to update a vehicle fault log, control the ignition to prevent the vehicle from moving forward, control the I/O system 145 to alert an operator, control a communication system of the vehicle to communicate a signal off-board the vehicle, and/or control the vehicle for movement but in a manner different than if the second friction brake unit was deemed fully functional (e.g., no blended braking, or blended braking only to the extent the second friction brake unit is determined to be functional to contribute to blended braking).

In the control system, the drive system control unit 116 may be configured, for determining the functionality of the second friction brake unit, to automatically control the second friction brake unit to apply at least one designated friction braking force to the second (e.g., front) set of wheels, to control the electric drive system to simultaneously apply at least one designated torque to the first (e.g., rear) set of wheels, and to monitor any resulting movement of the vehicle. For example, the designated friction braking force may be a full application of the second friction brake unit, and the designated torque may be a maximum torque level the second friction brake unit is designed/configured to accommodate, if fully functional, for preventing vehicle movement. Here, in this example, if there is no vehicle movement at the maximum torque level, the drive system control unit determines that the second friction brake unit is fully functional. However, if there is resulting vehicle movement, the second friction brake unit may be determined to be nonfunctional, or the drive system control unit may proceed by determining a degree of functionality. For example, the drive system control unit may automatically control the second friction brake unit to apply the full application of the second friction brake unit (e.g., continue to apply the full application), and then control the electric drive system to sequentially apply lower levels of torque (e.g., the maximum torque level, and then a torque level that is less than the maximum level by a factor 'x,' then a torque level that is less than the maximum level by '2x,' and so on, i.e., a linear stepped reduction) until there is no vehicle movement. At this point, the torque level which the second friction brake unit is able to accommodate without vehicle movement provides a measure of the degree to which the second friction brake unit is functional to prevent vehicle movement (and thereby functional to contribute to blended braking).

In other aspects, the designated torque level (applied to the first set of wheels) may be the minimum torque required to cause vehicle movement notwithstanding the full application of the second friction brake unit. Here, concurrent with a full application of the second friction brake unit, the drive system control unit 116 may be configured to control the electric drive system to sequentially apply increasingly greater levels of torque to the first set of wheels (i.e., a linear stepped increase) until vehicle movement occurs. The level at which vehicle movement occurs is indicative of the minimum torque required to cause vehicle movement notwithstanding the full application of the second friction brake unit. Specifically, if the drive system control unit is configured to apply increasingly greater levels of torque as a step function 'x' (i.e., each torque increase is by a constant designated value 'x'), the torque level at which vehicle movement occurs will be within a range 'x' (of the constant designated value of torque increase) of the minimum torque required to cause vehicle movement.

In another embodiment, the drive system control unit is configured to automatically control the second friction brake unit to sequentially apply plural different friction braking forces, and to control the electric drive system to respectively apply plural different torques simultaneously with the friction braking forces. That is, concurrent with each of the sequentially applied different friction braking forces, a different torque is applied. The different friction braking forces and torque levels may be linear, such that resulting vehicle movement (or lack thereof) is indicative of whether the second friction brake unit is operating linearly. The friction braking forces and torque levels may be aligned in terms of magnitude, e.g., each torque level is the maximum torque level the second friction brake unit is configured to accommodate at the given friction brake force to prevent vehicle movement.

According to an aspect of the invention, the drive system control unit may be configured to automatically control the second friction brake unit to apply the at least one designated friction braking force to the second (e.g., front) set of wheels (for determining functionality) without any application of the electric retarding to the first (e.g., rear) set of wheels and without any application of friction braking by the first friction brake unit to the first (e.g., rear) set of wheels. Thus, verification of the second friction brake unit is independent of operation of the first friction brake unit, independent of operator operation of a brake pedal, and independent of (although possibly complementary to) any vehicle system tests where all (or at least front and rear) friction brakes of the vehicle are assessed simultaneously.

As mentioned, the drive system control unit is configured to control one or more vehicle systems based on the determined functionality of the second friction brake unit. In addition to what else is described herein, this may include the drive system control unit controlling the friction brake system and the electric drive system for a blended braking application of the electric retarding applied to the first (e.g., rear) set of wheels and the friction brake application to the front set of wheels during movement of the vehicle on an inclined grade, without any application of friction braking by the first friction brake unit to the first (e.g., rear) set of wheels. For example, if the second friction brake unit is determined to be fully functional, the blended braking application may be carried out according to the full application of the second friction brake unit, as normal. If the second friction brake unit is determined to be nonfunctional, the blended braking may be discontinued during vehicle operation (i.e., no blended braking). If the second friction brake unit is determined to be partially functional, the blended braking may be discontinued, or applied only to the extent the second friction braking unit is functional.

In embodiments, the control is configured to verify the functionality of the front friction brakes of the vehicle 10 before commencing operation of the vehicle. Existing systems validate the complete, four-wheel brake system. As a result, it is possible that the rear brakes could be providing enough holding/stopping force to pass the test with weak front friction brakes. Accordingly, in slippery conditions, when the front friction brakes are needed to control the vehicle, the required braking force provided by the front brakes might not be available, or the pressure to force calibration could be off. This would degrade the ability of the control system to integrate the friction and electric retarder brakes, thus negatively impacting driveability and productivity.

In embodiments of the control system, in addition to a complete 4-wheel brake validation process, the drive system control unit 116, in conjunction with the friction braking system control unit 127, is configured to also verify the functionality of, solely, the front friction brake unit 118.

In connection with the above, embodiments of the control system may integrate the front brake control of the blended braking system with the existing drive system automatic brake validation system. In particular, as an additional step in a brake validation sequence that may be carried out for a vehicle, the drive system control unit 116 may be configured to communicate with the friction brake control unit 127 to command the front friction brake unit 118 to apply a designated friction braking force to the front wheels 14, then apply an appropriate torque to the rear wheels 12 to validate that the front friction brake unit 118 is capable of holding the vehicle 10. In an embodiment, the control system can validate several points, if necessary, to prove linearity. In an embodiment, the control system can validate several points to prove absolute capability.

In an embodiment, adding drive system control of the front brakes for blended braking creates a separate brake system (front only with drive system activation) which is independently validated during a pre-vehicle operation (e.g., pre-shift) brake test. This is in contrast to existing brake validation systems that only check the complete front and rear brakes as commanded by the foot-actuated brake pedal.

In other embodiments, alternatively or additionally, the control system 16 is configured for independent friction braking of the first and second sets of wheels 12, 14, e.g., rear and front wheels. Thus, for example, the drive system control unit 116 may be configured, in at least one mode of operation, to control the friction brake system 122 to sequentially apply plural different first braking pressures to the first set of wheels (e.g., the first friction brake unit 120 is directly or indirectly controlled to apply the first braking pressures to the first set of wheels), and concurrent with the first braking pressures, respectively apply plural second braking pressures to the second set of wheels (e.g., the second friction brake unit 118 is directly or indirectly controlled to apply the second braking pressure to the second set of wheels), with the respective first braking pressures and the second braking pressures being different from one another and being applied non-proportionally. That is, at different times and depending on the braking needs of the vehicle, different first braking pressures are applied to the first set of wheels. During at least some of the times when the different first braking pressures are applied, for each such first braking pressure, a respective second braking pressure is concurrently applied to the second set of wheels, which is different from the first braking pressure. The first and second braking pressures are applied non-proportionally, meaning not at a fixed proportion. This reflects that in embodiments, the control system 16 utilizes independent control of the front and rear brakes, such that the front and rear brakes are not applied always the same or at the same proportion.

With an independent control output for controlling the second (e.g., front) friction brake unit 118 to concurrently apply different friction braking levels than those applied by the first (e.g., rear) friction brake unit 120, the drive system control unit may be configured to control blended braking (e.g., front friction braking concurrent with rear wheel electric retarding and no rear friction braking) and/or control the friction brake pressures applied to the first and second sets of wheels to reduce friction brake wear unevenness, relative to only applying a fixed braking pressure proportion between the first and second sets of wheels (e.g., rear and front wheels). That is, especially in large OHVs, only applying a fixed proportion to the front and rear wheels will result in a first difference in total brake wear between the front and rear brakes over time, whereas applying different friction brake pressure levels, at different proportions, as in embodiments of the control system 16, will result in a lower, second difference in total brake wear between the front and rear brakes over the same time period.

Figure 5:
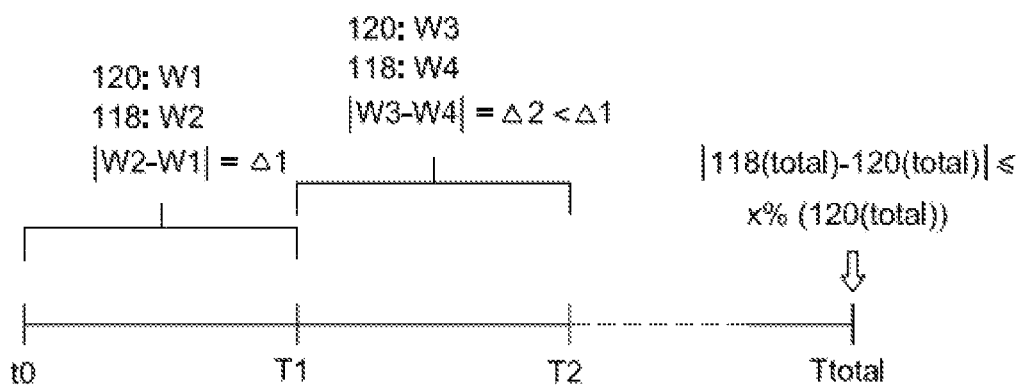
FIG. 5 is a graph illustrating control of friction brake wear, according to an embodiment.

Thus, with reference to FIG. 5, in an embodiment, the drive system control unit 116 is configured to determine a first wear 'W1' (e.g., first wear amount or wear rate) of the first friction brake unit 120 based at least in part on brake pressures and speeds at which the first friction brake unit is applied over a first time period 'T1' of operation of the vehicle. The drive system control unit may be configured to receive data relating to the pressure(s) and speed(s), e.g., from sensors and/or from the friction brake control unit, and/or it may be configured to determine the pressure(s) and/or speed(s) based on vehicle and brake system configuration data, along or in conjunction with related data from the sensors or friction brake control unit. The drive system control unit may be configured to determine the wear by integrating time at the pressure(s) and speed(s). The drive system control unit is further configured to determine a second wear 'W2' (e.g., second wear amount or wear rate) of the second friction brake unit 118 based at least in part on brake pressures and speeds at which the second friction brake unit is applied over the first time period T1. Based at least in part on the determined wears W1, W2, the drive system control unit is configured to control the first braking pressures applied to the first set of wheels and the second braking pressures applied to the second set of wheels for a total wear of the first braking unit '120(total)' to be no more than a percentage difference 'x' (e.g., no more than 10% different) from a total wear of the second braking unit '118(total)' over a second time period 'Ttotal'. (The second time period is at least as long as the first time period, reflecting that the wears may be determined, potentially multiple times, across shorter time periods than a time period of interest for reducing wear unevenness, such as a projected brake wear component lifespan.)

As an example, the system may be configured for the drive system control unit to determine the first and second wear amounts W1, W2 during the first time period T1, and to subsequently control differing levels of friction brakes to the first and second sets of wheels so that a difference 'Δ2' between subsequent wear amounts W3, W4 of the first and second sets of wheels during a subsequent time period T2 is less than a difference 'Δ1' between the initially-determined wear amounts W1, W2. The differing levels of friction brakes (e.g., to the front and rear wheels) applicable to reduce wear differences may be determined by the drive system control unit empirically over a number of brake application time periods, and/or based on brake system configuration data, vehicle configuration data, and/or sensor data of the vehicle and/or brake system in operation. For example, if a friction brake application at a fixed proportion (e.g., default fixed proportion as established by the friction brake control unit) results in first and second different wear amounts of the front and rear friction brakes during a first time period, the drive system control unit may subsequently apply different proportions during subsequent time periods, based on vehicle and braking system configuration data and/or sensor data and as a function of the braking needs of the vehicle (e.g., based on brake pedal position, vehicle speed, grade, etc.), to determine a trend (e.g., greater or less of a difference), and subsequently control the different friction brake applications to the front and rear brakes accordingly, based on the trend.

As noted, the drive system control unit may be configured to control the first braking pressures (applied by the first friction brake unit to the first set of wheels) and the second braking pressures (applied by the second friction brake unit to the second set of wheels) for the total wear of the first braking unit over a time period to be no more than a percentage difference, e.g., designated percentage difference, from the total wear of the second braking unit over the same time period. In embodiments, the percentage difference is kept as small as possible, meaning if the time period corresponds to a projected median lifespan of the wear elements of the friction brake units (or a similar time period), the wear elements will wear out at about the same time, or at least can both be replaced at the same time without undue waste. ("Wear element" refers to brake pads and other portions of a friction brake unit that are designed to wear out during normal operation of a vehicle and are periodically replaced during maintenance operations.) For example, in embodiments the percentage difference is no more than 10%, which may be a value around which it is more cost effective to replace the brake wear elements of the two friction brake units at the same time notwithstanding any remaining portion of the one brake unit. (That is, at the time one brake unit is completely worn out, the other brake unit may still have up to 10% of its wear elements remaining, but the value of in effect wasting the remaining 10% may be outweighed by the maintenance cost savings in replacing the wear elements of both brake units at the same time.) In other embodiments, the percentage difference is kept to no more than 5%. The particular percentage will be a function of maintenance costs for replacing wear elements of the brake units at different times and the purchase costs of the wear elements themselves. As should be appreciated, each friction brake unit is associated with plural (e.g., two) wheels, so the wear amount is cumulative of the wear elements of the plural wheels.

The percentage difference 'x' is illustrated in FIG. 5 relative to the absolute value of the difference between the total wears of the first and second friction brake units. That is, the absolute value of the difference between the total wears of the first and second friction brake units (|118(total)−120(total)|), over the time period of interest 'Ttotal', is kept to no more than x % (e.g., 5%, or 10%) of either of the total wears.

In embodiments, alternatively or additionally, the drive system control unit 116 is configured to control friction brake applications to the first and second sets of wheels (e.g., rear and front wheels), for reducing wear unevenness (as described above) or otherwise, during relatively low-level friction brake applications as defined relative to brake pedal position or position rate of change. For example, friction braking may be controlled to reduce wear unevenness when relatively low levels of braking are called for, without interfering with emergency or relatively higher-level friction braking applications where it is needed to more quickly stop or slow the vehicle regardless of wear unevenness.

Figure 4:
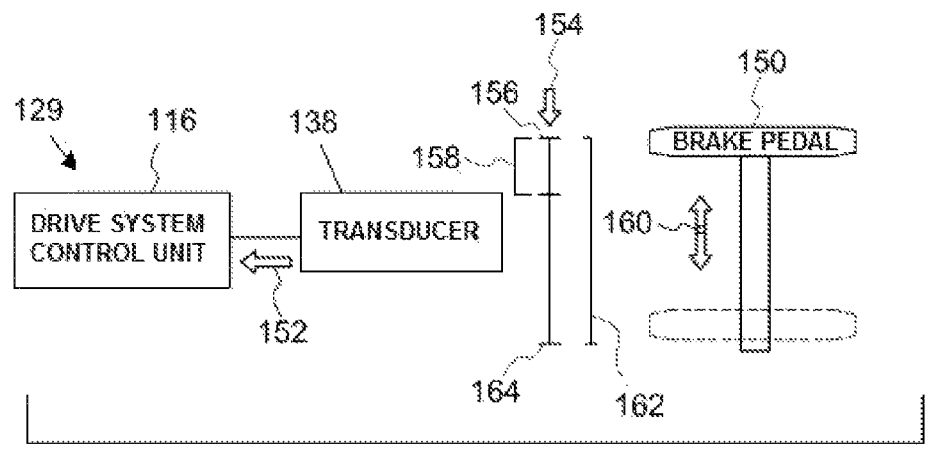
FIG. 4 is a schematic diagram illustrating a control system, according to another embodiment.

Thus, in an embodiment, with reference to FIG. 4, the control system further includes a brake pedal position transducer 138 associated with a brake pedal 150 of the vehicle. The brake pedal position transducer is electrically connected to the drive system control unit 116 and is configured to provide a signal 152 to the drive system control unit indicative of a position 154 of the brake pedal. (The signal may be an analog signal.) The drive system control unit is configured to determine if the position of the brake pedal is moved from an unactuated position 156 of the brake pedal to stopping within a designated range 158 of the unactuated position (or moved from one position within the range to stopping at another position within the range), and/or if a rate of change of a movement 160 of the brake pedal is below a designated threshold. (In embodiments where rate of change of movement is taken into account, the threshold is selected based on the overall configuration of the vehicle and the braking system such that rates above the threshold reflect relatively high desired levels of braking.) Responsive to the brake pedal being moved within the range, or from the unactuated position to within the range (in embodiments where that is taken into account), and/or the rate being below the threshold (in embodiments where that is taken into account), the drive system control unit is configured to determine one or more of the first braking pressures and one or more of the second braking pressures, and control the friction brake system to automatically apply the one or more of the first braking pressures to the first set of wheels and the one or more of the second braking pressures to the second set of wheels. The one or more first braking pressures may be concurrently applied with respective ones of the one or more second braking pressures. Also, the first and second braking pressures may both include non-zero braking pressures, meaning friction braking occurs, at least during some time periods, on both sets of wheels, and at some times, concurrently. In other embodiments, electric retarding of the first set of wheels (e.g., rear wheels) is concurrently or sequentially carried out in conjunction with friction braking of the first and second sets of wheels in this manner.

In embodiments, the designated range 158 is 25% of a total travel distance 162 of the brake pedal from the unactuated position to a fully actuated position 164 of the brake pedal.

For controlled low-level friction brake applications (e.g., to reduce wear unevenness) in conjunction with emergency or high-level friction brake applications (e.g., to slow or stop the vehicle more quickly and without regard to brake wear evenness), the system may be configured for the drive system control unit to control the first and second brake units during times when the position of the brake pedal is moved from the unactuated position of the brake pedal to stopping within the designated range of the unactuated position, and/or the rate of change of the movement of the brake pedal is below the designated threshold. The system is further configured for the friction brake control unit to control the first and second brake units, to apply a third braking pressure(s) to the first set of wheels and a fourth braking pressure(s) to the second set of wheels, respectively, during times when the position of the brake pedal is moved from the unactuated position of the brake pedal to stopping outside the designated range of the unactuated position, and/or the rate of change of the movement of the brake pedal is above the designated threshold (as applicable depending on the embodiment in question). The third and fourth braking pressures are greater than the first and second braking pressures, and may be based at least in part on the position of the brake pedal and/or the rate of change of the movement of the brake pedal. Further, the third and fourth braking pressures may be controlled at a fixed proportion. For example, the friction brake control unit may be a legacy controller (e.g., controller provided with a vehicle as stock equipment) that is configured (as per an embedded control algorithm, for example) for fixed proportional front and rear braking, with the drive system control unit in effect overriding the braking control of the friction brake control when only relatively low levels of braking are called for.

In other embodiments, alternatively or additionally, the drive system control unit is configured to control blended braking during times when relatively low levels of braking are called for (e.g., as determined based on brake pedal position or rate of change of movement). Here, for example, the drive system control unit may be configured, responsive to the position of the brake pedal being moved from the unactuated position to stopping within the designated range, and/or the rate of change of the movement of the brake pedal being below the designated threshold, to determine one or more of the second braking pressures, control the friction brake system to automatically sequentially apply the one or more of the second braking pressures to the second set of wheels, and concurrently with the second braking pressures being applied to the second set of wheels and the first braking pressures being zero (i.e., no friction braking of the first set of wheels), control the electric drive system to provide the electric retarding to the first set of wheels. The blended braking operation may be carried out in conjunction with, or for purposes of, reducing friction brake wear unevenness as described herein.

In embodiments, the system includes an independent front brake control output, and the drive system control unit is configured to determine how much front braking should be applied during low-level friction brake applications. The drive system control unit will either provide an output that results in blended braking (e.g., front friction brake application and rear retarder effort), or provide an output to the friction brake control unit to indicate the braking pressure proportions to apply for a more equal level of front and rear brake wear. The pedal that is normally actuated to apply the friction brakes is equipped to produce a signal output (e.g., analog output) to the drive system control unit. Within the low percentage application region of the pedal (approximately top 25% of pedal application), the friction brakes are controlled by the drive system control unit for more equal brake wear. (In this mode of operation, the hydraulic brake valves may no longer be actuated directly by the friction brake control unit.) Outside the low percentage application region of the pedal, high-percentage service brake pedal applications and/or emergency braking operations are controlled by the friction brake control unit, e.g., at a fixed proportion and at relatively higher braking pressure levels.

In such an embodiment, for example, the friction brake control unit is configured to control application of the first and second friction brake units at least partially in response to a position of a brake pedal of the vehicle. The drive system control unit is configured to determine a first wear of the first friction brake unit based at least in part on brake pressures and speeds at which the first friction brake unit is applied over a first time period of operation of the vehicle, and a second wear of the second friction brake unit based at least in part on brake pressures and speeds at which the second friction brake unit is applied over the first time period. The drive system control unit is configured, responsive to at least one of the position of the brake pedal being moved from an unactuated position of the brake pedal to stopping within a designated range of the unactuated position or a rate of change of a movement of the brake pedal being below a designated threshold, to: (i) determine one or more of the second braking pressures, control the friction brake system to automatically sequentially apply the one or more of the second braking pressures to the second set of wheels, and concurrently with the second braking pressures being applied to the second set of wheels and the first braking pressures being zero, control the electric drive system to provide the electric retarding to the first set of wheels; and/or (ii) automatically control the friction brake system to apply the first braking pressures to the first set of wheels and the second braking pressures to the second set of wheels (the first and second braking pressures include non-zero braking pressures) for a total wear of the first braking unit to be no more than 10% different from a total wear of the second braking unit over a second time period that is at least as long as the first time period. The friction brake control unit is configured to control the first and second brake units, to apply a third braking pressure to the first set of wheels and a fourth braking pressure to the second set of wheels, respectively, when the position of the brake pedal is moved from the unactuated position of the brake pedal to outside the designated range of the unactuated position and/or the rate of change of the movement of the brake pedal is above the designated threshold. The third and fourth braking pressures are greater than the first and second braking pressures and are based at least in part on the position of the brake pedal or the rate of change of the movement of the brake pedal.

Embodiments of the invention are applicable, as noted above, to relatively large/heavy vehicles, for example, haul trucks and other vehicles having a gross vehicle operating weight of at least 250 metric tons. However, while embodiments of the present invention have been described with specific reference to OHVs and other large vehicles of this type, the present invention is not intended to be so limited in this regard. In particular, it is contemplated that embodiments of the invention are equally applicable to electric vehicles generally, including but not limited to, smaller electric off-highway vehicles, electric or hybrid automobiles, and the like.

As noted above, the vehicle operator may be a person or an autonomous controller. Thus, "operator control" includes both controls that are operably by a human, and controls (e.g., control signals/inputs) associated with a control system/autonomous controller.

In any of the embodiments herein involving blended braking of electric retarding to a first set of wheels (e.g., rear wheels) and friction braking to a second set of wheels (e.g., front wheels), the system may be configured for the torque of the friction braking to be no more than 50% of the tractive effort generated by the electric retarding.

In embodiments, the control system may be configured to project or estimate when the wear elements of the friction brake units may need to be replaced, based on the determined wear amounts or rates. The control system (e.g., the drive system control unit) may be further configured to receive an input indicative of when the wear elements are replaced during a maintenance operation, for calibrating such determinations to a start point.

Embodiments of the invention relate to vehicles having a first set of wheels (e.g., rear wheels) and a second set of wheels (e.g., front wheels). In one aspect, none of the wheels of the first set are included in the second set, and vice versa. In another aspect, a vehicle includes four wheels only, namely, a first set of two rear wheels and a second set of two front wheels, with neither of the wheels of the first set being members of the second set and vice versa. In another aspect, a vehicle includes a first set of wheels (e.g., two rearmost wheels), a second set of wheels (e.g., two front wheels), and one or more intermediate wheels positioned between the first set and the second set (e.g., two additional rear wheels that are in front of the two rearmost wheels, which may or may not be drive wheels but in either case which do not contribute to vehicle steering). In another aspect, the wheels are provisioned with tires for the vehicle to drive on a paved or dirt roadway surface.

In an embodiment, a control system (e.g., braking control system) for a vehicle includes an electric drive system, a drive system control unit, and a friction brake system. The electric drive system is associated with a first set of wheels (e.g., rear wheels) of the vehicle. The drive system control unit is configured to control the electric drive system to selectively provide electric motive power to the first set of wheels to propel the vehicle and electric retarding to slow the vehicle. The friction brake system includes a first friction brake unit associated with the first set of wheels and a second friction brake unit associated with a second set of wheels (e.g., front wheels) of the vehicle. The drive system control unit is further configured to determine a functionality of the second friction brake unit, for a friction brake application to the second set of wheels, independent of operation of the first friction brake unit, and to control at least one vehicle system based on the determined functionality of the second friction brake unit.

In another embodiment, a control system (e.g., braking control system) for a vehicle includes an electric drive system, a drive system control unit, and a friction brake system. The electric drive system is associated with a first set of wheels (e.g., rear wheels) of the vehicle. The drive system control unit is configured to control the electric drive system to selectively provide electric motive power to the first set of wheels to propel the vehicle and electric retarding to slow the vehicle. The friction brake system includes a first friction brake unit associated with the first set of wheels and a second friction brake unit associated with a second set of wheels (e.g., front wheels) of the vehicle. The drive system control unit is further configured to determine a functionality of the second friction brake unit, for a friction brake application to the second set of wheels, independent of operation of the first friction brake unit, and to control at least one vehicle system based on the determined functionality of the second friction brake unit. The drive system control unit is configured, for determining the functionality of the second friction brake unit, to automatically control the second friction brake unit to apply at least one designated friction braking force to the front set of wheels, to control the electric drive system to simultaneously apply at least one designated torque to the rear set of wheels, and to monitor any resulting movement of the vehicle.

In another embodiment, a control system (e.g., braking control system) for a vehicle includes an electric drive system, a drive system control unit, and a friction brake system. The electric drive system is associated with a first set of wheels (e.g., rear wheels) of the vehicle. The drive system control unit is configured to control the electric drive system to selectively provide electric motive power to the first set of wheels to propel the vehicle and electric retarding to slow the vehicle. The friction brake system includes a first friction brake unit associated with the first set of wheels and a second friction brake unit associated with a second set of wheels (e.g., front wheels) of the vehicle. The drive system control unit is further configured to determine a functionality of the second friction brake unit, for a friction brake application to the second set of wheels, independent of operation of the first friction brake unit, and to control at least one vehicle system based on the determined functionality of the second friction brake unit. The at least one designated friction braking force is a full application of the second friction brake unit, and the at least one designated torque is a minimal torque required to cause the resulting movement notwithstanding the full application of the second friction brake unit.

In another embodiment, a control system (e.g., braking control system) for a vehicle includes an electric drive system, a drive system control unit, and a friction brake system. The electric drive system is associated with a first set of wheels (e.g., rear wheels) of the vehicle. The drive system control unit is configured to control the electric drive system to selectively provide electric motive power to the first set of wheels to propel the vehicle and electric retarding to slow the vehicle. The friction brake system includes a first friction brake unit associated with the first set of wheels and a second friction brake unit associated with a second set of wheels (e.g., front wheels) of the vehicle. The drive system control unit is further configured to determine a functionality of the second friction brake unit, for a friction brake application to the second set of wheels, independent of operation of the first friction brake unit, and to control at least one vehicle system based on the determined functionality of the second friction brake unit. The at least one designated friction braking force comprises plural different sequentially applied friction braking forces, and the at least one designated torque comprises plural different torques each applied simultaneously with a respective one of the friction braking forces. The plural different sequentially applied friction braking forces and the plural different torques may be linear.

In another embodiment, a control system (e.g., braking control system) for a vehicle includes an electric drive system, a drive system control unit, and a friction brake system. The electric drive system is associated with a first set of wheels (e.g., rear wheels) of the vehicle. The drive system control unit is configured to control the electric drive system to selectively provide electric motive power to the first set of wheels to propel the vehicle and electric retarding to slow the vehicle. The friction brake system includes a first friction brake unit associated with the first set of wheels and a second friction brake unit associated with a second set of wheels (e.g., front wheels) of the vehicle. The drive system control unit is further configured to determine a functionality of the second friction brake unit, for a friction brake application to the second set of wheels, independent of operation of the first friction brake unit, and to control at least one vehicle system based on the determined functionality of the second friction brake unit. The drive system control unit is configured to automatically control the second friction brake unit to apply the at least one designated friction braking force to the front set of wheels without any application of the electric retarding to the rear set of wheels and without any application of friction braking by the first friction brake unit to the rear set of wheels. The at least one vehicle system that the drive system control unit is configured to control based on the determined functionality of the second friction brake unit comprises the friction brake system and the electric drive system, for a blended braking application of the electric retarding applied to the rear set of wheels (e.g., electric retarding is applied only to the rear wheels) and the friction brake application to the front set of wheels (e.g., friction brakes are applied only to the front wheels) during movement of the vehicle on an inclined grade, without any application of friction braking by the first friction brake unit to the rear set of wheels.

In another embodiment, a control system (e.g., braking control system) for a vehicle includes an electric drive system, a drive system control unit, and a friction brake system. The electric drive system is associated with a first set of wheels (e.g., rear wheels) of the vehicle. The drive system control unit is configured to control the electric drive system to selectively provide electric motive power to the first set of wheels to propel the vehicle and electric retarding to slow the vehicle. The friction brake system includes a first friction brake unit associated with the first set of wheels and a second friction brake unit associated with a second set of wheels (e.g., front wheels) of the vehicle. The drive system control unit is further configured to determine a functionality of the second friction brake unit, for a friction brake application to the second set of wheels, independent of operation of the first friction brake unit, and to control at least one vehicle system based on the determined functionality of the second friction brake unit. The at least one vehicle system that the drive system control unit is configured to control based on the functionality of the second friction brake unit that is determined comprises the friction brake system and the electric drive system, for a blended braking application of the electric retarding applied to the rear set of wheels and the friction brake application to the front set of wheels during movement of the vehicle on an inclined grade, without any application of friction braking by the first friction brake unit to the rear set of wheels.

In another embodiment, a method includes controlling, with a drive system control unit, an electric drive system of a vehicle to selectively provide electric motive power to a first set of wheels of the vehicle (e.g., rear wheels) to propel the vehicle and electric retarding to slow the vehicle. The method further includes determining, with the drive system control unit, a functionality of a second friction brake unit of the vehicle, for a friction brake application to a second set of wheels of the vehicle (e.g., front wheels), independent of operation of a first friction brake unit of the vehicle. (The vehicle has a friction brake system that includes the first friction brake unit associated with the first set of wheels and the second friction brake unit associated with the second set of wheels.) The method further includes controlling at least one vehicle system based on the determined functionality of the second friction brake unit. The first set of wheels may comprise a rear set of wheels of the vehicle and the second set of wheels may comprise a front set of wheels of the vehicle.

In another embodiment of the method, the step of determining the functionality of the second friction brake unit includes automatically controlling the second friction brake unit to apply at least one designated friction braking force to the front set of wheels, controlling the electric drive system to simultaneously apply at least one designated torque to the rear set of wheels, and monitoring any resulting movement of the vehicle. In one aspect, the designated friction braking force is a full application of the second friction brake unit, and the torque includes plural different torque levels sequentially applied until vehicle movement stops or starts, as applicable. In another aspect, plural different friction braking forces are sequentially applied, and plural different torques are respectively applied simultaneously with the friction braking forces. The different friction braking forces and torques may be linear.

In another embodiment of the method, the second friction brake unit is automatically controlled to apply the at least one designated friction braking force to the front set of wheels without any application of the electric retarding to the rear set of wheels and without any application of friction braking by the first friction brake unit to the rear set of wheels.

In another embodiment of the method, controlling the at least one vehicle system based on the determined functionality of the second friction brake unit includes controlling the friction brake system and the electric drive system for a blended braking application of the electric retarding applied to the rear set of wheels and the friction brake application to the front set of wheels during movement of the vehicle on an inclined grade, without any application of friction braking by the first friction brake unit to the rear set of wheels.

In another embodiment, a control system includes an electric drive system associated with a first set of wheels of a vehicle (e.g., rear wheels), and a drive system control unit configured to control the electric drive system to selectively provide electric motive power to the first set of wheels to propel the vehicle and electric retarding to slow the vehicle. The system further includes a friction brake system having a first friction brake unit associated with the first set of wheels and a second friction brake unit associated with a second set of wheels of the vehicle (e.g., front wheels). The system further includes a brake pedal position transducer associated with a brake pedal of the vehicle. The brake pedal position transducer is electrically connected to the drive system control unit and is configured to provide a signal to the drive system control unit indicative of a position of the brake pedal. The drive system control unit is further configured, in a mode of operation when at least one of the position of the brake pedal is moved from an unactuated position of the brake pedal to stopping within a designated range of the unactuated position or a rate of change of a movement of the brake pedal is below a designated threshold, to (i) control the friction brake system and the electric drive system for a blended braking operation of the electric retarding applied to the first set of wheels and friction braking applied to the second set of wheels only and/or (ii) control the friction brake system for different non-zero, non-proportional levels of friction braking to be applied to the first set of wheels and the second set of wheels. The drive system control unit is configured to determine the different non-zero, non-proportional levels of friction braking so that a total wear of the first braking unit over a time period is no more than 10% different from a total wear of the second braking unit over the time period.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. As used herein, "electrical communication" or "electrically coupled" means that certain components are configured to communicate with one another through direct or indirect signaling by way of direct or indirect electrical connections.

What is claimed is:

1. A control system, comprising:
   an electric drive system associated with a first set of wheels of a vehicle;
   a drive system control unit having one or more processors configured to control the electric drive system to selectively provide electric motive power to the first set of wheels to propel the vehicle and electric retarding to slow the vehicle; and
   a friction brake system having a first friction brake unit associated with the first set of wheels and a second friction brake unit associated with a second set of wheels of the vehicle;
   wherein the drive system control unit is further configured, in at least one mode of operation, to control the friction brake system to sequentially apply plural different first braking pressures to the first set of wheels, and concurrent with the first braking pressures, respectively apply plural second braking pressures to the second set of wheels, wherein the respective first braking pressures and the second braking pressures are different from one another and are applied non-proportionally.

2. The system of claim 1, further comprising:
   a brake pedal position transducer associated with a brake pedal of the vehicle, wherein the brake pedal position transducer is electrically connected to the drive system control unit and is configured to provide a signal to the drive system control unit indicative of a position of the brake pedal;
   wherein the drive system control unit is configured, responsive to at least one of the position of the brake pedal being moved from an unactuated position of the brake pedal to stopping within a designated range of the unactuated position or a rate of change of a movement of the brake pedal being below a designated threshold, to determine one or more of the first braking pressures and one or more of the second braking pressures, and control the friction brake system to automatically apply the one or more of the first braking pressures to the first set of wheels and the one or more of the second braking pressures to the second set of wheels, the first and second braking pressures including non-zero braking pressures.

3. The system of claim 2, wherein the drive system control unit is configured, responsive to the at least one of the position of the brake pedal being moved from the unactuated position of the brake pedal to stopping within the designated range or the rate of change of the movement of the brake pedal being below the designated threshold, to control the electric drive system to provide the electric retarding to the first set of wheels concurrent with the one or more of the first braking pressures being applied to the first set of wheels and the one or more of the second braking pressures being applied to the second set of wheels.

4. The system of claim 2, wherein:
the drive system control unit is configured to determine: a first wear of the first friction brake unit based at least in part on brake pressures and speeds at which the first friction brake unit is applied over a first time period of operation of the vehicle; and a second wear of the second friction brake unit based at least in part on brake pressures and speeds at which the second friction brake unit is applied over the first time period; and
the drive system control unit is configured to control the first braking pressures and the second braking pressures for a total wear of the first braking unit to be no more than 10% different from a total wear of the second braking unit over a second time period that is at least as long as the first time period.

5. The system of claim 4, wherein the first set of wheels comprises rear wheels of the vehicle and the second set of wheels comprises front wheels of the vehicle.

6. The system of claim 4, wherein the designated range is 25% of a total travel distance of the brake pedal from the unactuated position to a fully actuated position of the brake pedal.

7. The system of claim 4, wherein a gross vehicle operating weight of the vehicle is at least 250 metric tons.

8. The system of claim 2, further comprising a friction brake control unit, wherein:
the system is configured for the drive system control unit to control the first and second brake units when the at least one of the position of the brake pedal is moved from the unactuated position of the brake pedal to stopping within the designated range of the unactuated position or the rate of change of the movement of the brake pedal is below the designated threshold; and
the system is further configured for the friction brake control unit to control the first and second brake units, to apply a third braking pressure to the first set of wheels and a fourth braking pressure to the second set of wheels, respectively, the third and fourth braking pressures being greater than the first and second braking pressures and based at least in part on the position of the brake pedal or the rate of change of the movement of the brake pedal, when at least one the position of the brake pedal is moved from the unactuated position of the brake pedal to stopping outside the designated range of the unactuated position or the rate of change of the movement of the brake pedal is above the designated threshold.

9. The system of claim 2, wherein the first set of wheels comprises rear wheels of the vehicle and the second set of wheels comprises front wheels of the vehicle.

10. The system of claim 2, wherein the designated range is 25% of a total travel distance of the brake pedal from the unactuated position to a fully actuated position of the brake pedal.

11. The system of claim 2, wherein a gross vehicle operating weight of the vehicle is at least 250 metric tons.

12. The system of claim 1, further comprising:
a brake pedal position transducer associated with a brake pedal of the vehicle, wherein the brake pedal position transducer is electrically connected to the drive system control unit and is configured to provide a signal to the drive system control unit indicative of a position of the brake pedal;
wherein the drive system control unit is configured, responsive to at least one of the position of the brake pedal being moved from an unactuated position of the brake pedal to stopping within a designated range of the unactuated position or a rate of change of a movement of the brake pedal being below a designated threshold, to determine one or more of the second braking pressures, control the friction brake system to automatically sequentially apply the one or more of the second braking pressures to the second set of wheels, and concurrently with the second braking pressures being applied to the second set of wheels and the first braking pressures being zero, control the electric drive system to provide the electric retarding to the first set of wheels.

13. The system of claim 12, wherein the first set of wheels comprises rear wheels of the vehicle and the second set of wheels comprises front wheels of the vehicle.

14. The system of claim 12, wherein the designated range is 25% of a total travel distance of the brake pedal from the unactuated position to a fully actuated position of the brake pedal.

15. The system of claim 12, wherein a gross vehicle operating weight of the vehicle is at least 250 metric tons.

16. The system of claim 1, further comprising:
a friction brake control unit configured to control application of the first and second friction brake units at least partially in response to a position of a brake pedal of the vehicle; and
a brake pedal position transducer associated with the brake pedal of the vehicle, wherein the brake pedal position transducer is electrically connected to at least one of the drive system control unit or the friction brake control unit to provide a signal to the at least one of the drive system control unit or the friction brake control unit indicative of the position of the brake pedal;
wherein the drive system control unit is configured to determine: a first wear of the first friction brake unit based at least in part on brake pressures and speeds at which the first friction brake unit is applied over a first time period of operation of the vehicle; and a second wear of the second friction brake unit based at least in part on brake pressures and speeds at which the second friction brake unit is applied over the first time period;
wherein the drive system control unit is configured, responsive to at least one of the position of the brake pedal being moved from an unactuated position of the brake pedal to stopping within a designated range of the unactuated position or a rate of change of a movement of the brake pedal being below a designated threshold, to at least one of:
determine one or more of the second braking pressures, control the friction brake system to automatically sequentially apply the one or more of the second braking pressures to the second set of wheels, and concurrently with the second braking pressures being applied to the second set of wheels and the first braking pressures being zero, control the electric drive system to provide the electric retarding to the first set of wheels; or
automatically control the friction brake system to apply the first braking pressures to the first set of wheels and the second braking pressures to the second set of wheels, the first and second braking pressures including non-zero braking pressures, for a total wear of the first braking unit to be no more than 10% different from a total wear of the second braking unit over a second time period that is at least as long as the first time period; and wherein the friction brake control unit is configured to control the first and second brake units, to apply a third braking pressure to the first set of wheels and a fourth braking pressure to the second set of wheels, respectively, the third and fourth braking pressures being greater than the first and second braking pressures and based at least in part on the position of the brake pedal or the rate of change of the movement of the brake pedal, when at least one the position of the brake pedal is moved from the unactuated position of the brake pedal to outside the designated range of the unactuated position or the rate of change of the movement of the brake pedal is above the designated threshold.

17. The system of claim 16, wherein the first set of wheels comprises rear wheels of the vehicle and the second set of wheels comprises front wheels of the vehicle.

18. The system of claim 16, wherein the designated range is 25% of a total travel distance of the brake pedal from the unactuated position to a fully actuated position of the brake pedal.

19. The system of claim 16, wherein a gross vehicle operating weight of the vehicle is at least 250 metric tons.

20. The system of claim 1, wherein:
the drive system control unit is configured to determine: a first wear of the first friction brake unit based at least in part on brake pressures and speeds at which the first friction brake unit is applied over a first time period of operation of the vehicle; and a second wear of the second friction brake unit based at least in part on brake pressures and speeds at which the second friction brake unit is applied over the first time period; and
the drive system control unit is configured to control the first braking pressures and the second braking pressures for a total wear of the first braking unit to be no more than 10% different from a total wear of the second braking unit over a second time period that is at least as long as the first time period.

21. A control system, comprising:
an electric drive system associated with a first set of wheels of a vehicle;
a drive system control unit having one or more processors configured to control the electric drive system to selectively provide electric motive power to the first set of wheels to propel the vehicle and electric retarding to slow the vehicle;
a friction brake system having a first friction brake unit associated with the first set of wheels and a second friction brake unit associated with a second set of wheels of the vehicle; and
a brake pedal position transducer associated with a brake pedal of the vehicle, wherein the brake pedal position transducer is electrically connected to the drive system control unit and is configured to provide a signal to the drive system control unit indicative of a position of the brake pedal;
wherein the drive system control unit is further configured, in a mode of operation when at least one of the position of the brake pedal is moved from an unactuated position of the brake pedal to stopping within a designated range of the unactuated position or a rate of change of a movement of the brake pedal is below a designated threshold, to at least one of control the friction brake system and the electric drive system for a blended braking operation of the electric retarding applied to the first set of wheels and friction braking applied to the second set of wheels only or control the friction brake system for different non-zero, non-proportional levels of friction braking to be applied to the first set of wheels and the second set of wheels, the drive system control unit being configured to determine the different non-zero, non-proportional levels of friction braking so that a total wear of the first braking unit over a time period is no more than 10% different from a total wear of the second braking unit over the time period.

* * * * *